(12) United States Patent
Kim et al.

(10) Patent No.: US 10,090,523 B2
(45) Date of Patent: Oct. 2, 2018

(54) LITHIUM COBALT COMPOSITE OXIDE FOR LITHIUM SECONDARY BATTERY, PREPARATION METHOD THEREOF, AND LITHIUM SECONDARY BATTERY INCLUDING POSITIVE ELECTRODE INCLUDING LITHIUM COBALT COMPOSITE OXIDE

(71) Applicant: Samsung SDI Co., Ltd, Yongin-si, Gyeonggi-do (KR)

(72) Inventors: Jihyun Kim, Yongin-si (KR); Dohyung Park, Yongin-si (KR); Seonyoung Kwon, Yongin-si (KR); Juhyeong Han, Yongin-si (KR); Jinhwa Kim, Yongin-si (KR); Minhan Kim, Yongin-si (KR); Kyounghyun Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 157 days.

(21) Appl. No.: 14/701,328

(22) Filed: Apr. 30, 2015

(65) Prior Publication Data

US 2015/0372301 A1    Dec. 24, 2015

(30) Foreign Application Priority Data

Jun. 19, 2014    (KR) .......................... 10-2014-0075053

(51) Int. Cl.
*H01M 4/525*    (2010.01)
*C01G 51/00*    (2006.01)
(Continued)

(52) U.S. Cl.
CPC ............ *H01M 4/525* (2013.01); *C01G 51/42* (2013.01); *H01M 10/052* (2013.01);
(Continued)

(58) Field of Classification Search
CPC .............. H01M 4/525; H01M 10/052; H01M 2004/028; C01G 51/42; C01P 2006/40;
(Continued)

(56) References Cited

U.S. PATENT DOCUMENTS 5,728,367 A * 3/1998 Mao ....................... C01G 51/42
423/395
2004/0213729 A1  10/2004 Suhara et al.
(Continued)

FOREIGN PATENT DOCUMENTS

KR    10-2004-0053217 A    6/2004
KR    10-2005-0037123 A    4/2005
(Continued)

OTHER PUBLICATIONS

Bates et al. Journal of The Electrochemical Society, 147 (1) 59-70 (2000).*

*Primary Examiner* — Peter F Godenschwager
*Assistant Examiner* — Andrew J. Oyer
(74) *Attorney, Agent, or Firm* — Knobbe Martens Olson & Bear LLP

(57) ABSTRACT

Provided is a lithium cobalt composite oxide for a lithium secondary battery represented by Formula 1 below and having a polycrystalline state, a method of preparing the same, a positive electrode for a lithium battery including the lithium cobalt composite oxide, and a lithium secondary battery including a positive electrode, which includes the lithium cobalt composite oxide.

$Li_aCo_bO_c$    Formula 1

In Formula 1, a is an integer from 0.9 to 1.1, b is an integer from 0.980 to 1.0000, and c is an integer from 1.9 to 2.1. Also included is a method of manufacture therefor.

7 Claims, 4 Drawing Sheets

(51) Int. Cl.
*H01M 10/052* (2010.01)
*H01M 4/02* (2006.01)

(52) U.S. Cl.
CPC ...... *C01P 2004/03* (2013.01); *C01P 2004/51* (2013.01); *C01P 2004/61* (2013.01); *C01P 2004/62* (2013.01); *C01P 2006/40* (2013.01); *H01M 2004/028* (2013.01)

(58) Field of Classification Search
CPC .............. C01P 2004/51; C01P 2004/61; C01P 2004/62; C01P 2004/03
See application file for complete search history.

(56) References Cited

U.S. PATENT DOCUMENTS

| | | | |
|---|---|---|---|
| 2005/0214645 A1* | 9/2005 | Horichi | C01G 51/42 429/231.3 |
| 2005/0220701 A1 | 10/2005 | Suhara et al. | |
| 2005/0266305 A1* | 12/2005 | Ohata | H01M 2/1646 429/144 |
| 2012/0276454 A1 | 11/2012 | Mori et al. | |
| 2013/0323570 A1* | 12/2013 | Iwanaga | H01M 2/166 429/145 |

FOREIGN PATENT DOCUMENTS

| | | |
|---|---|---|
| KR | 10-2005-0044770 A | 5/2005 |
| KR | 10-2005-0084852 A | 8/2005 |
| KR | 10-0855509 B1 | 8/2008 |
| KR | 10-2012-0101093 A | 9/2012 |

\* cited by examiner

US 10,090,523 B2

LITHIUM COBALT COMPOSITE OXIDE FOR LITHIUM SECONDARY BATTERY, PREPARATION METHOD THEREOF, AND LITHIUM SECONDARY BATTERY INCLUDING POSITIVE ELECTRODE INCLUDING LITHIUM COBALT COMPOSITE OXIDE

INCORPORATION BY REFERENCE TO ANY PRIORITY APPLICATIONS

This application claims the benefit of Korean Patent Application No. 10-2014-0075053, filed on Jun. 19, 2014, in the Korean Intellectual Property Office, the disclosure of which is incorporated herein in its entirety by reference.

BACKGROUND

Field

The described technology generally relates to a lithium cobalt composite oxide for a lithium secondary battery, a method of preparing the lithium cobalt composite oxide, and a lithium secondary battery including a positive electrode including the lithium cobalt composite oxide.

Description of the Related Technology

A lithium secondary battery produces high voltages and has a high energy density and is used for various purposes. For example, since electric vehicles (HEV, PHEV) need to operate at a high temperature, and their lithium secondary battery requires charging and discharging large amounts of electricity, and need to be used for a long period of time, a lithium secondary battery having excellent discharge capacity and lifespan characteristics is needed.

A lithium cobalt oxide has excellent energy density per volume and thus, it is generally used as a positive electrode active material. To further improve capacity of the lithium cobalt oxide, the grain size and the shape of powder need to be controlled.

SUMMARY

Some embodiments provide a lithium cobalt composite oxide for a lithium secondary battery having improved energy density, and a method of manufacturing the lithium cobalt composite oxide.

Some embodiments provide a lithium secondary battery having improved capacity and high rate characteristics by including a positive electrode, which comprises a lithium cobalt composite oxide.

Additional aspects will be set forth in part in the description which follows and, in part, will be apparent from the description, or may be learned by practice of the presented embodiments.

According to some embodiments, provided is a lithium cobalt composite oxide for a lithium secondary battery represented by Formula 1 and having a polycrystalline state:

Formula 1 wherein, a is an integer from 0.9 to 1.1, b is an integer from 0.980 to 1.0000, and c is an integer from 1.9 to 2.1.

According to some embodiments, provided is a method of manufacturing a lithium cobalt composite oxide for a lithium secondary battery, the method comprises heat-treating a mixture of cobalt oxide ($Co_3O_4$) and a lithium precursor at a temperature of about 1000° C. to about 1200° C. to obtain the lithium composite oxide described herein.

In some embodiments, the cobalt oxide ($Co_3O_4$) is obtained by adjusting the pH of a mixture of a cobalt precursor, a precipitating agent, and a chelating agent to be in a range from about 9 to about 12 to perform co-precipitation and obtain cobalt hydroxide as a precipitate; and drying and heat-treating the precipitate.

Some embodiments disclosed herein provide a positive electrode or a lithium secondary battery, which comprises the lithium cobalt composite oxide disclosed herein.

According to some embodiments, provided is a lithium secondary battery including a positive electrode, which comprises the lithium cobalt composite oxide disclosed herein.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF CERTAIN INVENTIVE EMBODIMENTS

Figure 1:
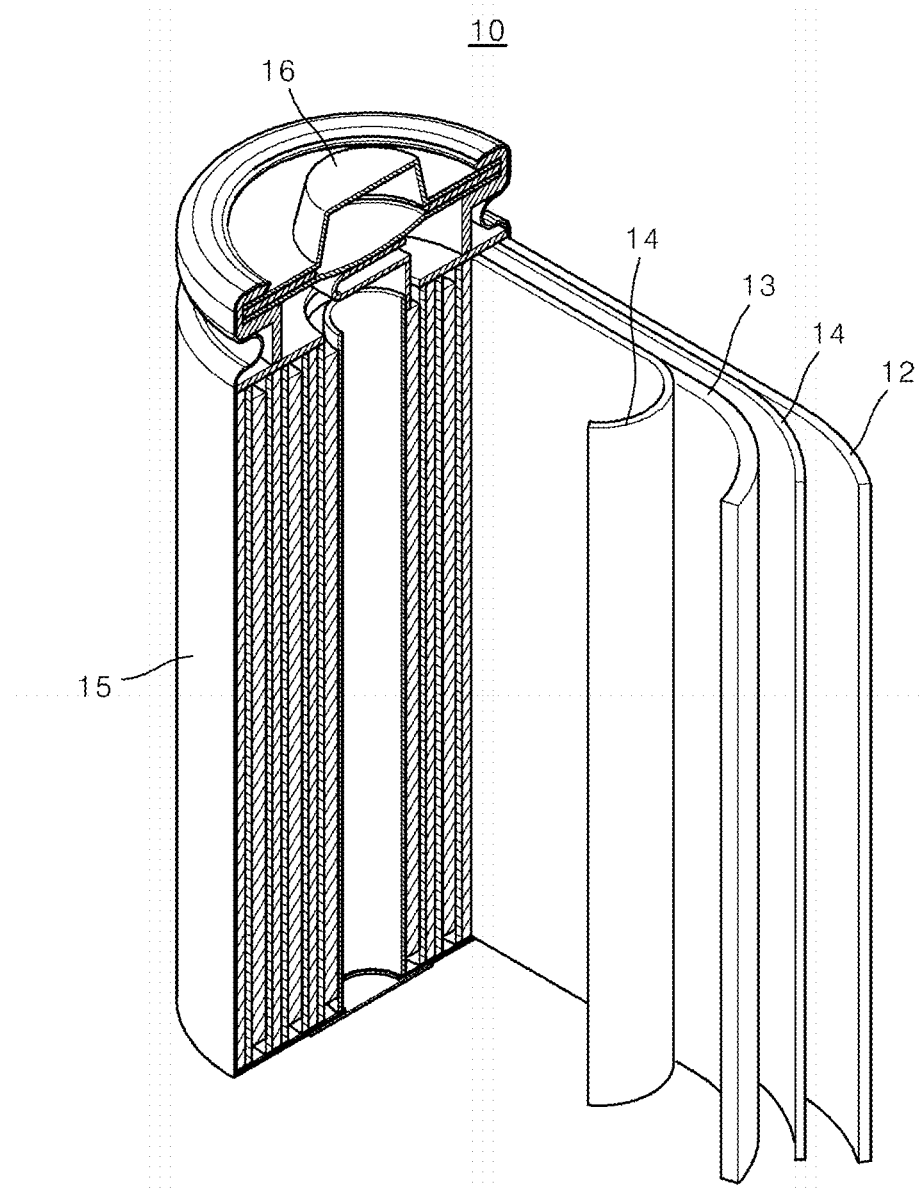
FIG. 1 is a schematic diagram of an exemplary lithium secondary battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, lithium cobalt composite oxide, methods of preparing the lithium cobalt composite oxide and lithium secondary batteries including a positive electrode, which comprises the lithium cobalt composite oxide, will be described in greater detail.

Some embodiemts provide a lithium cobalt composite oxide for a lithium secondary battery, wherein the lithium cobalt composite oxide is represented by Formula 1 below and has a polycrystalline structure.

Formula 1

In Formula 1, a is an integer from 0.9 to 1.1, b is an integer selected from 0.980 to 1.0000, and c is an integer selected from 1.9 to 2.1.

In some embodiments, the lithium cobalt composite oxide represented by Formula 1 may be $LiCoO_2$.

In some embodiments, the lithium cobalt composite oxide may have a polycrystalline structure. The polycrystalline structure of the lithium cobalt composite oxide may be identified through a scanning electron microscope. A lithium cobalt composite oxide having a monocrystalline structure has a smooth surface, whereas a lithium cobalt composite oxide having a polycrystalline structure has an uneven surface.

In some embodiments, the lithium cobalt composite oxide exists as a mixture of primary particles and secondary particles, which are aggregates of primary particles.

It would be appreciated that the energy density characteristics of the lithium cobalt composite oxide may be improved by optimizing the ratio of secondary particles to primary particles. In some embodiments, the amount of secondary particles may be about 500 parts by weight to about 1000 parts by weight based on 100 parts by weight of primary particles.

It would be appreciated that the capacity and high rate characteristics of the lithium secondary battery may be improved by optimizing the average diameters of primary and secondary particles. In some embodiments, the average diameter of primary particle is about 0.5 μm to about 15 μm and the average diameter of secondary particle is about 5 μm to about 20 μm. When the average diameters of the primary particle and the secondary particle are within these ranges, capacity and high rate characteristics of the lithium secondary battery including the positive electrode, which includes the lithium cobalt composite oxide are excellent.

In some embodiments, the average diameter ($D_{50}$) of the lithium cobalt composite oxide according to an embodiment may be about 5 μm to about 20 μm. As used herein, the term "$D_{50}$" refers to a diameter at 50 volume % in a cumulative distribution curve of diameter distribution based on a total volume of 100%, in which the diameter is accumulated from the smallest to the greatest (hereinafter, referred to as "$D_{50}$").

Hereinafter, a method of preparing a lithium cobalt composite oxide for a lithium secondary battery according to an embodiment will be described in detail.

In some embodiments, the lithium cobalt composite oxide is synthesized by using co-precipitation.

First, cobalt oxide ($Co_3O_4$) and a lithium precursor mixture are heat-treated at a temperature of about 1000° C. to about 1200° C.

In some embodiments, the lithium precursor may be lithium hydroxide, lithium fluoride, lithium carbonate, or a mixture thereof. An amount of a lithium precursor may be stoichiometrically adjusted, such that the lithium cobalt composite oxide of Formula 1 may be obtained. For example, an amount of the lithium precursor may be about 1.0 mole to about 1.1 moles based on 1 mole of cobalt oxide.

In some embodiments, the heat-treatment is performed in an oxidizing gas atmosphere. The oxidizing gas atmosphere includes oxidizing gas such as oxygen or air and for example, the oxidizing gas may comprise about 10 volume % to about 20 volume % of oxygen or air and about 80 volume % to about 90 volume % of inert gas.

In some embodiments, the cobalt oxide may be obtained according to the processes described below. In some embodiments, the cobalt oxide may have an average diameter of the primary particle of about 500 nm to about 5 μm.

First, a cobalt precursor, a precipitator, a chelating agent, and a solvent are mixed to obtain a mixture and pH of the mixture is adjusted to about 9 to about 12, and then co-precipitated to form a precipitate.

In some embodiments, the precipitator is a pH controller, which may be sodium hydroxide solution.

In some embodiments, the chelating agent may be ammonia or ammonium sulfate.

Nitrogen may optionally be purged into the mixture to obtain a co-precipitate, which may then be filtered and dried to obtain cobalt hydroxide.

In some embodiments, drying is performed at a temperature of about 100° C. to about 150° C.

When pH of the mixture is in a range of about 9 to about 12, a lithium cobalt composite oxide having a desired crystallinity and particle state may be obtained.

In some embodiments, the cobalt precursor may be cobalt sulfate, cobalt nitrate, and cobalt chloride. In some embodiments, the amount of the cobalt precursor is stoichiometrically adjusted, such that the lithium cobalt composite oxide of Formula 1 may be obtained.

The solvent may be water or the like. It would be appreciated that the amount of the solvent may be optimized to obtain a mixture in which each component is uniformly mixed. In some embodiments, the amount of the solvent may be about 100 parts by weight to about 3000 parts by weight based on a total weight of 100 parts by weight of the cobalt precursor.

As described herein, according to some embodiments, a primary particle size of cobalt hydroxide, which is a precursor of lithium cobalt composite oxide, may be adjusted to control a particle shape and state of lithium cobalt composite oxide prepared therefrom, and thus, improve electrochemical properties. In some embodiments, an average diameter of the primary particle of the cobalt hydroxide is about 0.1 nm to about 500 nm. In some embodiments, the lithium cobalt composite oxide is in a polycrystalline state. It would be appreciated that a lithium cobalt composite oxide having a polycrystalline structure may be used for preparing a positive electrode to improve the high charge & discharge cycle rate characteristics and capacity properties of a lithium secondary battery.

Hereinafter, processes for manufacturing a lithium secondary battery using the lithium cobalt composite oxide as a positive electrode active material for a lithium secondary battery will be described in detail and a method of manufacturing a lithium secondary battery including a positive electrode, a negative electrode, a lithium salt-containing non-aqueous electrolyte, and a separator, according to embodiments of the present invention will be described.

In some embodiments, the positive electrode and the negative electrode are each prepared by coating current collectors with a composition for forming a positive electrode active material layer and a composition for forming a negative electrode active material layer respectively and then drying the same.

In some embodiments, the composition for forming the positive electrode active material layer is prepared by mixing a positive electrode active material, a conductor, a binder, and a solvent and the lithium composite oxide represented by Formula 1 above may be used as the positive electrode active material.

In some embodiments, the binder is a component that facilitates binding of active material to a conductor or the like, or to a current collector, and the binder may be added in an amount of about 1 part by weight to about 50 parts by weight based on a total weight of 100 parts by weight of the positive electrode active material. Non-limiting examples of the binder include polyvinylidene fluoride, polyvinyl alcohol, carboxymethylcellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluoride rubber, and various copolymers. An amount of the binder may be about 2 parts by weight to about 5 parts by weight based on a total weight of 100 parts by weight of the positive electrode active material.

The conducting agent may be any suitable material that does not induce chemical changes to the battery and has conductivity, for example, graphite such as natural graphite or artificial graphite; a carbonaceous material such as carbon black, acetylene black, Ketjen black, channel black, furnace black, lamp black, and summer black; conductive fiber such as carbon fiber and metal fiber; metal powder of carbon fluoride, aluminum, nickel, or the like; a conductive whisker such as zinc oxide and potassium titanate; a conductive metal oxide such as titanium oxide; a conductive material such as a polyphenylene derivative.

In some embodiments, the amount of the conducting agent may be about 2 parts by weight to about 5 parts by weight, based on a total weight of 100 parts by weight of the positive electrode active material.

A non-limiting example of the solvent is N-methyl pyrrolidone.

In some embodiments, the amount of the solvent may be about 1 part by weight to about 10 parts by weight based on a total weight of 100 parts by weight of the positive electrode active material.

In some embodiments, the positive electrode current collector has a thickness of about 3 μm to about 500 μm. The current collector is not particularly limited as long as the current collector does not cause a chemical change to a battery and has high conductivity. Examples of a material that forms the current collector are stainless steel, aluminum, nickel, titanium, calcined carbon, and aluminum and stainless steel that are surface-treated with carbon, nickel, titanium, silver, or the like. Also, an uneven micro structure may be formed on the surface of the current collector to enhance binding strength to the positive electrode active material. Also, the current collector may be used in various forms including a film, a sheet, a foil, a net, a porous structure, a foaming structure, a non-woven structure, etc.

In addition, apart from the processes described above, the negative electrode active material, the binder, the conducting agent, and the solvent are mixed to prepare a composition for forming a negative electrode active material layer.

The negative electrode active material may be formed of a material that is capable of intercalating and deintercalating lithium ions. Non-limiting examples of the negative electrode active material include carbonaceous materials such as graphite and carbon, a lithium metal, an alloy thereof, and a silicon oxide-based material. According to an embodiment of the present invention, silicon oxide may be used.

In some embodiments, the binder may be used in an amount of about 1 part by weight to about 50 parts by weight based on a total weight of 100 parts by weight of the negative electrode active material. Non-limiting examples of the binder include materials that are of similar types to the positive electrode.

In some embodiments, the conducting agent may be used in an amount of about 1 part by weight to about 5 parts by weight based on a total weight of 100 parts by weight of the negative electrode active material.

In some embodiments, the amount of the solvent is in a range of about 1 part by weight to about 10 parts by weight based on a total weight of 100 parts by weight of the negative electrode active material.

In some embodiments, the conducting agent and the solvent may include materials of similar types to those used in preparing the positive electrode.

In some embodiments, the negative electrode current collector is formed into a thickness of about 3 μm to about 500 μm. The negative electrode current collector is not particularly limited as long as the current collector does not cause a chemical change to a battery and has conductivity. Examples of a material that may be used to form the current collector are copper, stainless steel, aluminum, nickel, titanium, calcined carbon, copper and stainless steel that are surface-treated with carbon, nickel, titanium, silver, or the like, and an aluminum-cadmium alloy. Also, as in the case of the positive electrode active material, an uneven micro structure may be formed on the surface of the current collector to enhance a binding strength to the negative electrode active material. Also, the current collector may be used in various forms including a film, a sheet, a foil, a net, a porous structure, a foaming structure, a non-woven structure, etc.

In some embodiments, a separator is disposed between the positive electrode and the negative electrode prepared according to the processes described above.

In some embodiments, the separator has a pore diameter of about 0.01 μm to about 10 μm, and a thickness of the separator is generally about 5 μm to about 300 μm. Detailed examples of the separator include an olefin-based polymer such as polypropylene and polyethylene; and a sheet formed of glass fiber or a non-woven fiber. When a solid electrolyte such as polymer is used as an electrolyte, the solid electrolyte may also include the separator.

A lithium salt-containing non-aqueous electrolyte includes non-aqueous electrolyte solution and lithium. The non-aqueous electrolyte may be a non-aqueous electrolyte solution, an organic solid electrolyte, and an inorganic solid electrolyte.

Non-limiting examples of the non-aqueous electrolyte solution include aprotic organic solvents, such as N-methyl-2-pyrrolidinone, propylene carbonate, ethylene carbonate, butylene carbonate, dimethyl carbonate, diethyl carbonate, gamma-butyrolactone, 1,2-dimethoxyethane, 2-methyl tetrahydrofuran, dimethylsulfoxide, 1,3-dioxolane, N,N-formamide, N,N-dimethyl formamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

The organic solid electrolyte may be, for example, a polyethylene derivative, a polyethylene oxide derivative, a polypropylene oxide derivative, a phosphoric acid ester polymer, polyester sulfide, polyvinyl alcohol, or polyvinylidene fluoride. The inorganic solid electrolyte may be, for example, a Li nitride, a halogenide, a sulfide, and/or a silicate such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any material that may be dissolved well in the non-aqueous electrolyte, for example, at least one of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carbonic acid lithium, tetraphenyl boric acid lithium, or the like may be used.

FIG. 1 is a schematic diagram of a lithium secondary battery according to an embodiment.

Referring to FIG. 1, the lithium battery 10 primarily includes a positive electrode 13, a negative electrode 12, a separator 14 disposed between the positive and negative electrodes 12 and 13, an electrolyte (not shown) impregnated in the positive electrode 13, negative electrode 12, and the separator 14, a battery case 15, and a cap assembly 16 sealing the battery case 15. The lithium battery 10 may include the positive electrode 13, the negative electrode 12, and the separator 14, which are sequentially layered and then rolled into a spiral shape to be housed in the battery case 15. Then, the battery case 15 may be sealed with the cap assembly 16 to complete the lithium secondary battery 10.

Hereinafter, the present embodiments will be described in greater detail with reference to Examples and Comparative Examples. However, the Examples are for illustrative purposes only and do not limit the scope of the present invention.

EXAMPLE 1

A cobalt sulfate aqueous solution, a NaOH aqueous solution, which is a precipitating agent, and a $NH_4OH$ aqueous solution, which is a chelating agent were prepared, the three solutions were simultaneously added to a reactor, and pH of a reaction mixture obtained therefrom was adjusted to 10 to prepare a precipitate.

The precipitate obtained therefrom was filtered, washed and then dried overnight at a temperature of 120° C. to obtain cobalt hydroxide ($Co(OH)_2$).

The cobalt hydroxide obtained therefrom was primary heat-treated at a temperature of about 700° C. in an oxygen-containing atmosphere to obtain cobalt oxide ($Co_3O_4$).

The cobalt oxide obtained therefrom and lithium carbonate were dry-mixed such that the atomic ratio of lithium and cobalt was about 1 and the mixture obtained therefrom was subjected to secondary heat-treated at a temperature of about 1100° C. in an oxygen-containing atmosphere to obtain lithium cobalt composite oxide ($LiCoO_2$).

EXAMPLE 2

Lithium cobalt composite oxide ($LiCoO_2$) was obtained in the same manner as described in Example 1, except that the secondary heat-treatment temperature was changed to about 1000° C.

EXAMPLE 3

Lithium cobalt composite oxide ($LiCoO_2$) was obtained in the same manner as described in Example 1, except that the secondary heat-treatment temperature was changed to about 1200° C.

EXAMPLE 4

Lithium cobalt composite oxide ($LiCoO_2$) was obtained in the same manner as described in Example 1, except that the pH of the reaction mixture was changed to about 9.

EXAMPLE 5

Lithium cobalt composite oxide ($LiCoO_2$) was obtained in the same manner as described in Example 1, except that the pH of the reaction mixture was changed to about 12.

COMPARATIVE EXAMPLE 1

Lithium cobalt oxide ($LiCoO_2$) was obtained in the same manner as described in Example 1, except that the secondary heat-treatment temperature was changed to about 800° C.

COMPARATIVE EXAMPLE 2

Lithium cobalt oxide ($LiCoO_2$) was obtained in the same manner as described in Example 1, except that the pH of the reaction mixture was changed to about 13.

MANUFACTURING EXAMPLE 1

A coin cell was manufactured in the same manner as in Example 1 by using one of the embodiments of lithium cobalt composite oxides, which is a positive electrode active material.

A mixture of 96 g of the positive electrode active material obtained from Example 1, 2 g of polyvinylidene fluoride, 47 g of N-methyl pyrrolidone, which is a solvent, and 2 g of carbon black, which is a conducting agent, was removed of bubbles by using a mixer to prepare a slurry for forming a positive electrode active material layer.

An aluminum film was coated with the slurry prepared according to the processes described above by using a doctor blade to prepare a thin electrode plate, the electrode plate was dried at a temperature of 135° C. for 3 hours or more and then pressured and vacuum dried to manufacture a positive electrode.

The positive electrode and a lithium metal thin film as a counter electrode were used to manufacture a 2032-type coin cell. A separator (thickness: about 16 µm) formed of porous polyethylene (PE) was disposed between the positive electrode and the lithium metal thin film, and an electrolyte solution was injected thereto to manufacture a coin cell.

In this regard, the electrolyte solution was a solution in which 1.1 M $LiPF_6$ was dissolved in a mixture solvent including ethylene carbonate (EC) and ethyl methyl carbonate (EMC) mixed at a volume ratio of 3:5.

MANUFACTURING EXAMPLE 2-5

A coin cell was manufactured in the same manner as in Manufacturing Example 1, except that the positive electrode active material obtained in Example 2-5 was used instead of the positive electrode active material obtained in Example 1.

COMPARATIVE MANUFACTURING EXAMPLE 1-2

A coin cell was manufactured in the same manner as in Manufacturing Example 1, except that the positive electrode active material obtained in Comparative Example 1-2 was used instead of the positive electrode active material obtained in Example 1.

EVALUATION EXAMPLE 1

Measuring Pellet Density

Pellet density of the lithium cobalt composite oxide obtained in Examples 1-5 and Comparative Examples 1 and 2 were measured. As an apparatus for measuring pellet density, #3912 from CARVER Inc. (Wabash, Ind.) was used.

Pellet density was calculated according to Equation 1 below.

pellet density ρ(g/cc)=weight of active material (g)/
surface area of pellet (cm²)×(x-rod length)
(mm)×0.1                                          Equation 1

In Formula 1 above, x represents a total height of a roller and a sample (pellets).

Measurement results of rolling strength are as shown in Table 1 below.

TABLE 1

|  | Pellet density (g/cc) |
|---|---|
| Example 1 | 3.66 |
| Example 2 | 3.58 |
| Example 3 | 3.60 |
| Example 4 | 3.63 |
| Example 5 | 3.65 |
| Comparative Example 1 | 3.20 |
| Comparative Example 2 | 3.45 |

Referring to Table 1 above, lithium cobalt composite oxides prepared in Examples 1 to 4 showed improved pellet density compared to those of lithium oxides prepared in Comparative Examples 1 and 2.

EVALUATION EXAMPLE 2

Scanning Electron Microscope Images

Cobalt hydroxide, cobalt oxide, and lithium cobalt composite oxide prepared in Example 1 and Comparative Example 1 were analyzed by using a scanning electron microscope (SEM). Analysis results are as shown in FIGS. 2-7.

Figure 2:
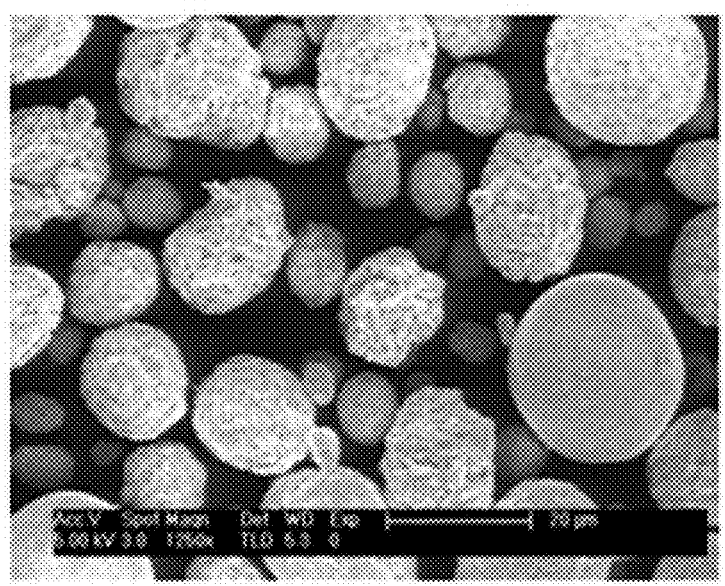
FIG. 2 is a scanning electron microscope image of cobalt hydroxide prepared according to Example 1.
Figure 3:
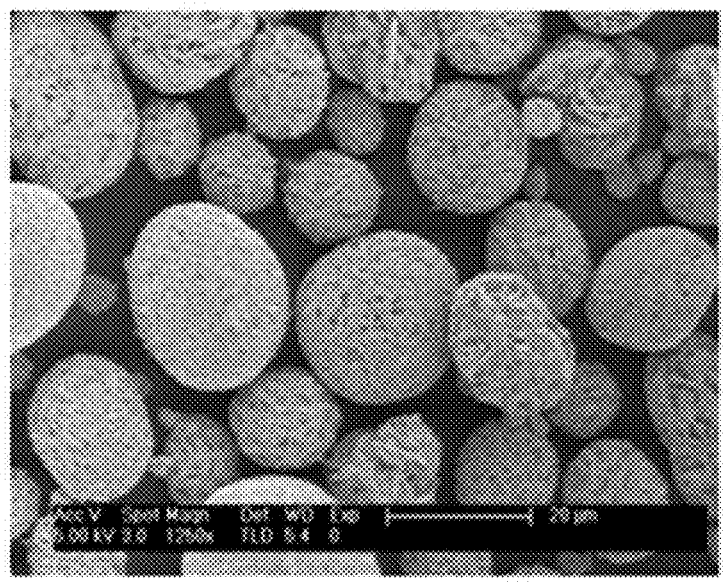
FIG. 3 is a scanning electron microscope image of cobalt oxide prepared according to Example 1.
Figure 4:
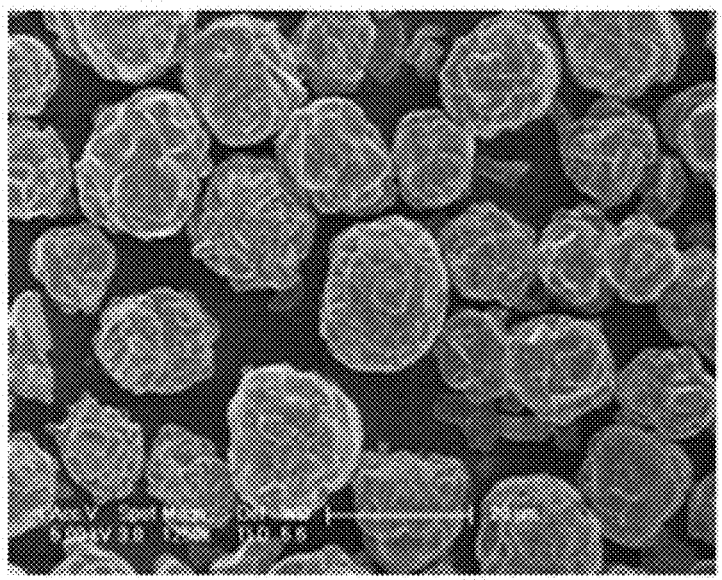
FIG. 4 is a scanning electron microscope image of lithium cobalt composite oxide prepared according to Example 1.
Figure 5:
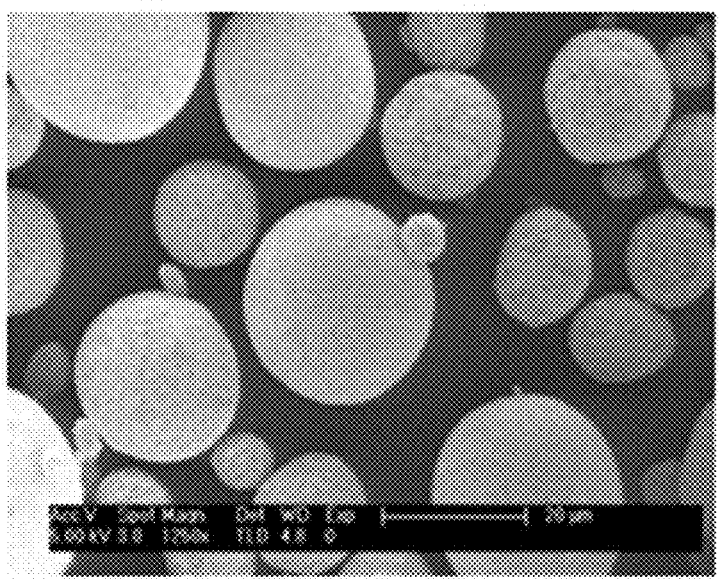
FIG. 5 is a scanning electron microscope image of cobalt hydroxide prepared according to Comparative Example 1.
Figure 6:
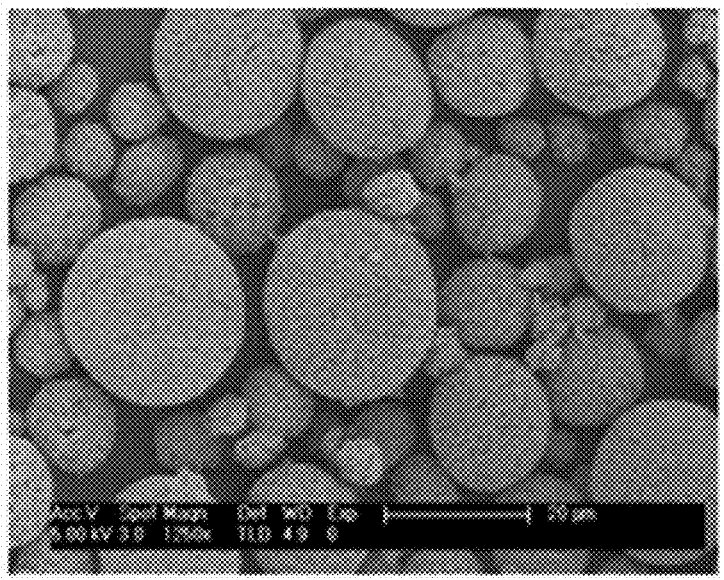
FIG. 6 is a scanning electron microscope image of cobalt oxide prepared according to Comparative Example 1.
Figure 7:
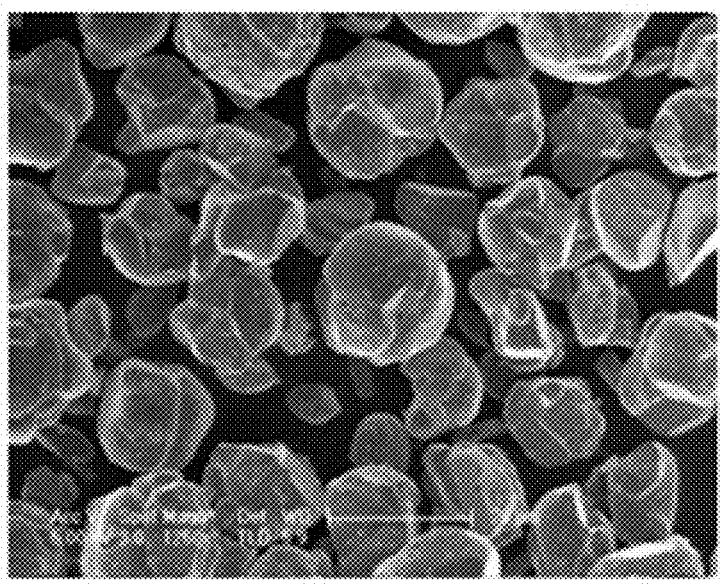
FIG. 7 is a scanning electron microscope image of lithium cobalt oxide prepared according to Comparative Example 1.

FIGS. 2 to 4 are SEM images of cobalt hydroxide, cobalt oxide, and lithium cobalt composite oxide prepared according to Example 1; and FIGS. 5 to 7 are SEM images of cobalt hydroxide, cobalt oxide, and lithium cobalt oxide prepared according to Comparative Example 1.

As shown in FIG. 2 above, cobalt hydroxide obtained in Example 1 showed an increase in the size of a primary particle compared to that of cobalt hydroxide obtained in Comparative Example 1 in FIG. 5.

Referring to FIGS. 3 and 6, cobalt oxide obtained in Example 1 showed an increased size of a primary particle compared to cobalt oxide obtained in Comparative Example 1 in FIG. 6.

Based on a comparison between FIGS. 4 and 7, lithium cobalt oxide obtained in Comparative Example 1 has a very smooth crystalline state on the surface thereof, unlike lithium cobalt composite oxide obtained in Example 1, which had a polycrystalline state with an uneven surface. As such, the pH of a reaction mixture for obtaining cobalt hydroxide may be adjusted to adjust the size of a primary particle of cobalt hydroxide and make the final lithium cobalt composite oxide in a poly-crystalline state, and thus, improve electrochemical properties of such a lithium cobalt composite oxide.

Also, lithium cobalt composite oxide obtained in Example 1 included primary particles and secondary particles, which are aggregates of the primary particles, whereas lithium cobalt oxide obtained in Comparative Example 1 only included primary particles.

An average diameter of the primary particles of lithium cobalt composite oxide in Example 1 was about 5 μm and an average diameter of the secondary particles was about 15 μm. Also, an amount of the secondary particles was about 750 parts by weight based on 100 parts by weight of the primary particles.

EVALUATION EXAMPLE 3

Charge and Discharge Experiment

Charge and discharge characteristics of the coin cells supplied by Manufacturing Examples 1 to 5 and Comparative Manufacturing Examples 1 and 2 were measured by using a charger and discharger (company: TOYO (Fukushima, JAPAN), model: TOYO-3100) and results obtained therefrom are shown in Table 2 below.

First, the coin cells manufactured in Manufacturing Examples 1 to 4 and Comparative Manufacturing Examples 1 and 2 were charged and discharged once at 0.1 C for a formation process, initial charge and discharge characteristics were identified through a charge and discharge process at 0.1 C, and then 50 repetitions of the charge and discharge process were performed at 1 C to analyze cycle characteristics of the coin cells. The coin cells were pre-set such that charging of the coin cells begins in a constant current (CC) mode and changes into a constant voltage mode, and then charging is cut-off at 0.01 C, and discharging of the coin cells is cut off in a CC mode at 1.5 V.

(1) Initial Charge Efficiency (I.C.E)

I.C.E was measured according to Equation 2 below.

Initial charge and discharge efficiency [%]=[1$^{st}$ cycle
discharge capacity/1$^{st}$ cycle charge capacity]×
100                                          Equation 2

(2) Charge Capacity and Discharge Capacity

During the first cycle, charge capacity and discharge capacity were measured.

TABLE 2

|  | Charge capacity (mAh/g) | Discharge capacity (mAh/g) | I.C.E (%) |
|---|---|---|---|
| Manufacturing Example 1 | 201.6 | 193.9 | 96.2 |
| Manufacturing Example 2 | 200.3 | 193.8 | 96.7 |
| Manufacturing Example 3 | 199.4 | 193.5 | 97.0 |
| Manufacturing Example 4 | 200.5 | 193.2 | 96.4 |
| Manufacturing Example 5 | 199.9 | 192.9 | 96.5 |
| Comparative Manufacturing Example 1 | 190.4 | 179.2 | 94.1 |
| Comparative Manufacturing Example 2 | 198.6 | 191 | 96.2 |

EVALUATION EXAMPLE 4

High Rate Discharge Characteristics

The coin cells manufactured in Manufacturing Examples 1 to 4 and Comparative Manufacturing Examples 1 and 2 were charged under conditions of a constant current of 0.1 C, constant voltage of 1.0 V, and cut-off at 0.01 C, then the coin cells were rested for 10 minutes, and then the coin cells were discharged at a constant current of 0.2 C, 0.5 C, 1 C, or 2 C until voltage reached 2.5 V. In other words, discharge rate was changed to 0.2 C, 0.5 C, 1 C, or 2 C to evaluate high rate characteristics of the coin cells. The high rate characteristics are shown in Table 3 below.

The high rate discharge characteristics in Table 3 below may be calculated by using Formula 3 below.

High rate discharge characteristics (%)=(Discharge capacity during discharging of the cells at 0.2 C, 0.5 C, 1 C, or 2 C)/(discharge capacity during discharging of the cells at a rate of 0.1 C)×100     Formula 3

TABLE 3

| | High rate discharge characteristics (0.2 C/0.1 C) (%) | High rate discharge characteristics (0.5 C/0.1 C) (%) | High rate discharge characteristics (1 C/0.1 C) (%) | High rate discharge characteristics (2 C/0.1 C) (%) |
|---|---|---|---|---|
| Manufacturing Example 1 | 101 | 98 | 96 | 93 |
| Manufacturing Example 2 | 99 | 98 | 96 | 92 |
| Manufacturing Example 3 | 101 | 99 | 98 | 95 |
| Manufacturing Example 4 | 100 | 97 | 96 | 93 |
| Comparative Manufacturing Example 1 | 95 | 96 | 93 | 88 |
| Comparative Manufacturing Example 2 | 99 | 97 | 94 | 90 |

Based on Table 3 above, it may be concluded that the coin cells manufactured in Manufacturing Examples 1 to 4 showed better high rate characteristics than the coin cells manufactured in Comparative Manufacturing Examples 1 and 2. In this regard, better 'high rate characteristics' refers to the fact that a reduction rate of standardized capacity (in other words, capacity retention rate) according to an increase in charging rate (C-rate) is small.

As described above, according to the one or more of the above embodiments of the present invention, when a positive electrode including lithium cobalt composite oxide according to an embodiment is used, a lithium secondary battery having improved capacity and high charge & discharge rate characteristics may be manufactured.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A lithium cobalt composite oxide for a lithium secondary battery represented by Formula 1:

$Li_aCo_bO_c$     Formula 1 wherein, a is an integer from 0.9 to 1.1, b is an integer from 0.980 to 1.0000, and c is an integer from 1.9 to 2.1, wherein the lithium cobalt composite oxide is a mixture of primary particles and secondary particles where the secondary particles are polycrystalline and have an uneven surface, and an average diameter of the primary particles is 0.5 μm to 15 μm and an average diameter of the secondary particles is 5 μm to 20μm, wherein an amount of the secondary particles is about 500 parts by weight to about 1000 parts by weight based on 100 parts by weight of the primary particles; and wherein the lithium cobalt composite oxide for a lithium secondary battery represented by Formula 1 is made by method comprising:

heat-treating cobalt hydroxide in an oxygen-containing atmosphere at a temperature of 600° C. to 800° C. to obtain cobalt oxide ($Co_3O_4$), wherein an average diameter of primary particle of the cobalt hydroxide is about 0.1 nm to about 500 nm and an average diameter of primary particle of cobalt oxide is about 500 nm to about 5μm; and heat-treating a mixture consisting of the cobalt oxide ($Co_3O_4$) and a lithium precursor at a temperature of 1000° C. to about 1200° C. to obtain the lithium cobalt composite oxide for a lithium secondary battery represented by Formula 1.

2. The lithium cobalt composite oxide of claim 1, wherein the lithium cobalt composite oxide represented by Formula 1 is $LiCoO_2$.

3. The lithium cobalt composite oxide of claim 1, wherein an amount of the secondary particles is 500 parts by weight to 1000 parts by weight based on 100 parts by weight of the primary particles.

4. The lithium cobalt composite oxide of claim 1, wherein an average diameter of the lithium cobalt composite oxide primary particles is about 5 μm and an average diameter of the lithium cobalt composite oxide secondary particles is about 15 μm.

5. A positive electrode, which comprises the lithium cobalt composite oxide of claim 1.

6. A lithium secondary battery comprising a positive electrode, which comprises the lithium cobalt composite oxide of claim 1.

7. The lithium secondary battery of claim 6, wherein the lithium cobalt composite oxide represented by Formula 1 is $LiCoO_2$.

* * * * *